US012756318B2

(12) United States Patent
Ezra et al.

(10) Patent No.: US 12,756,318 B2
(45) Date of Patent: Oct. 6, 2026

(54) OUTPUT CONDUCTION DETECTION IN A BUCK CONVERTER

(71) Applicant: POWER INTEGRATIONS, INC., San Jose, CA (US)

(72) Inventors: Noam Ezra, Cambridge (GB); David Michael Hugh Matthews, Los Gatos, CA (US); Antonius Jacobus Johannes Werner, Cambridge (GB)

(73) Assignee: POWER INTEGRATIONS, INC., San Jose, CA (US)

( * ) Notice: Subject to any disclaimer, the term of this patent is extended or adjusted under 35 U.S.C. 154(b) by 325 days.

(21) Appl. No.: 18/393,347

(22) Filed: Dec. 21, 2023

(65) Prior Publication Data

US 2025/0211120 A1 Jun. 26, 2025

(51) Int. Cl.
*H02M 3/158* (2006.01)
*H02M 1/00* (2006.01)

(52) U.S. Cl.
CPC ....... *H02M 3/1588* (2013.01); *H02M 1/0019* (2021.05)

(58) Field of Classification Search
CPC .......................... H02M 3/1588; H02M 1/0019
USPC .......................................................... 323/247
See application file for complete search history.

(56) References Cited

U.S. PATENT DOCUMENTS 4,005,352 A 1/1977 Kugler et al.
5,014,178 A 5/1991 Balakrishnan
5,282,107 A 1/1994 Balakrishnan
5,285,369 A 2/1994 Balakrishnan
5,602,724 A 2/1997 Balakrishnan
6,597,588 B2 7/2003 Matsumoto
6,865,093 B2 3/2005 Disney
7,345,894 B2 3/2008 Sawtell et al.
7,489,120 B2 2/2009 Matthew
8,120,097 B2 2/2012 Disney
8,933,649 B2 1/2015 Matthews et al.
(Continued)

FOREIGN PATENT DOCUMENTS

CN 103023298 A 4/2013
WO 2021126826 A1 6/2021

OTHER PUBLICATIONS

U.S. Appl. No. 18/393,278; "Non-Final Office Action mailed Aug. 11, 2025"; 9 pages.

(Continued)

*Primary Examiner* — Yemane Mehari

(57) ABSTRACT

An integrated controller for a buck converter has an output conduction detector circuit that provides the input or high side of the controller with visibility of the discharge period and thereby prevents continuous current mode operation in case of a short-circuited output. The controller receives a feedback signal indicative of an output voltage of the buck converter and produces an input drive signal. A bias drive circuit receives the input drive signal and produces a bias drive signal. A bias supply circuit includes a bias transistor and a bias diode. The bias drive transistor receives the bias drive signal to enter a conducting state when the bias drive signal is asserted. The output conduction detector circuit detects an output conduction event as a voltage drop across the bias transistor, due to conduction of freewheeling current through either the bias transistor or bias diode, and produces an output conduction signal.

16 Claims, 7 Drawing Sheets

(56) References Cited

U.S. PATENT DOCUMENTS

| | | | |
|---|---|---|---|
| 9,219,420 | B1 | 12/2015 | Zhang et al. |
| 9,331,587 | B2 | 5/2016 | Djenguerian et al. |
| 9,479,065 | B2 | 10/2016 | Mao et al. |
| 9,531,264 | B2 | 12/2016 | Ryan et al. |
| 9,577,520 | B2 | 2/2017 | Xiu et al. |
| 9,621,050 | B2 | 4/2017 | Ryan et al. |
| 9,667,154 | B2 | 5/2017 | Colbeck |
| 9,735,663 | B2 | 8/2017 | Bhasin et al. |
| 9,917,584 | B2 | 3/2018 | Gong et al. |
| 10,038,434 | B2 | 7/2018 | Volke et al. |
| 10,135,357 | B1 | 11/2018 | Balakrishnan et al. |
| 10,326,306 | B2 | 6/2019 | Peter et al. |
| 10,551,224 | B2 * | 2/2020 | Kobayashi ........ H02J 7/007182 |
| 10,797,598 | B1 * | 10/2020 | Malla .................... H02M 3/158 |
| 10,924,028 | B2 | 2/2021 | Duvnjak |
| 11,258,369 | B2 | 2/2022 | Odell |
| 11,418,121 | B2 | 8/2022 | Odell et al. |
| 11,979,090 | B2 | 5/2024 | Werner et al. |
| 2013/0077353 | A1 | 3/2013 | Kuang et al. |
| 2014/0369097 | A1 * | 12/2014 | Prescott .............. H02M 1/4225 323/284 |
| 2019/0393871 | A1 | 12/2019 | Springett |
| 2021/0203235 | A1 | 7/2021 | Odell et al. |
| 2021/0257923 | A1 | 8/2021 | Odell |
| 2022/0360177 | A1 * | 11/2022 | Castellano .......... H02M 1/0845 |
| 2023/0170803 | A1 * | 6/2023 | Ferrara ............... H02M 3/1566 323/271 |
| 2024/0186903 | A1 | 6/2024 | Matthews |
| 2024/0213903 | A1 | 6/2024 | Matthews et al. |
| 2025/0211120 | A1 | 6/2025 | Ezra et al. |

OTHER PUBLICATIONS

Broadmeadow, Mark; "Characterisation of the cascode gate drive of power MOSFETs in clamped inductive switching applications"; Mar. 25, 2015; Queensland University of Technology; pp. 81-85.

Power Integrations, Inc., "LinkSwitch-TN2 Family: Highly Energy Efficient Off-line Switcher IC with Integrated System Level Protection for Low Component-Count Power Supplies", Jun. 2023, 28 pages.

U.S. Appl. No. 18/393,278; "Application as Filed"; filed Dec. 21, 2023; 34 pages.

* cited by examiner

OUTPUT CONDUCTION DETECTION IN A BUCK CONVERTER

CROSS-REFERENCE TO RELATED APPLICATION

Aspects of this application relate to a power converter having an integrated self-bias function described in the following application filed concurrently herewith. The related application, which is incorporated herein by reference, is U.S. patent application Ser. No. 18/393,278, of David Michael Hugh Matthews, entitled "Self-Biasing the Input Controller in a Power Converter" and issued as U.S. Pat. No. 12,592,639 on Mar. 31, 2026.

FIELD OF THE INVENTION

The present invention relates generally to power converters, and more specifically to buck converters. Even more specifically, the present invention relates to detecting output conduction in buck converters.

BACKGROUND

Electric utilities transmit unregulated alternating current (ac), which carries electrical signals across long distances and between buildings. This transmission requires a very high voltage that most circuits, e.g., electronic devices, within houses and businesses cannot handle. The voltage needs to be stepped down to be used in those settings. Switched mode power converters, also referred to as switching power converters, are commonly used to provide a lower voltage to many of today's electronics due to their high efficiency, small size, and low weight. The switched mode power converter converts high voltage related to the unregulated ac input, to a lower voltage related to a constant or stable direct current (dc) output also known as a regulated dc output through an energy transfer element, e.g., a transformer. The switched mode power converter usually provides dc output regulation by sensing one or more signals representative of one or more output quantities, for example, voltage, current, or the combination of the two, and controlling the output in a closed loop. In operation, a switch is used to provide the desired output by varying the duty cycle, the switching frequency, or varying the number of pulses per unit time of the switch in a switched mode power converter.

Power converters generally include one or more controllers which sense and regulate the output of the power converter. These controllers generally require a regulated or unregulated voltage source to power the circuit components of the controller. In high voltage buck converters for automotive applications, e.g., 30-1000V input voltage, continuous current mode (CCM) operation is problematic due to the slow recovery of the output conductor circuit, e.g., the free-wheeling diode or the synchronous rectifier. As such this mode of operation is to be avoided.

The input or high side of the controller has typically no visibility of the discharge period and thus cannot prevent CCM operation in case of a short-circuited output.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
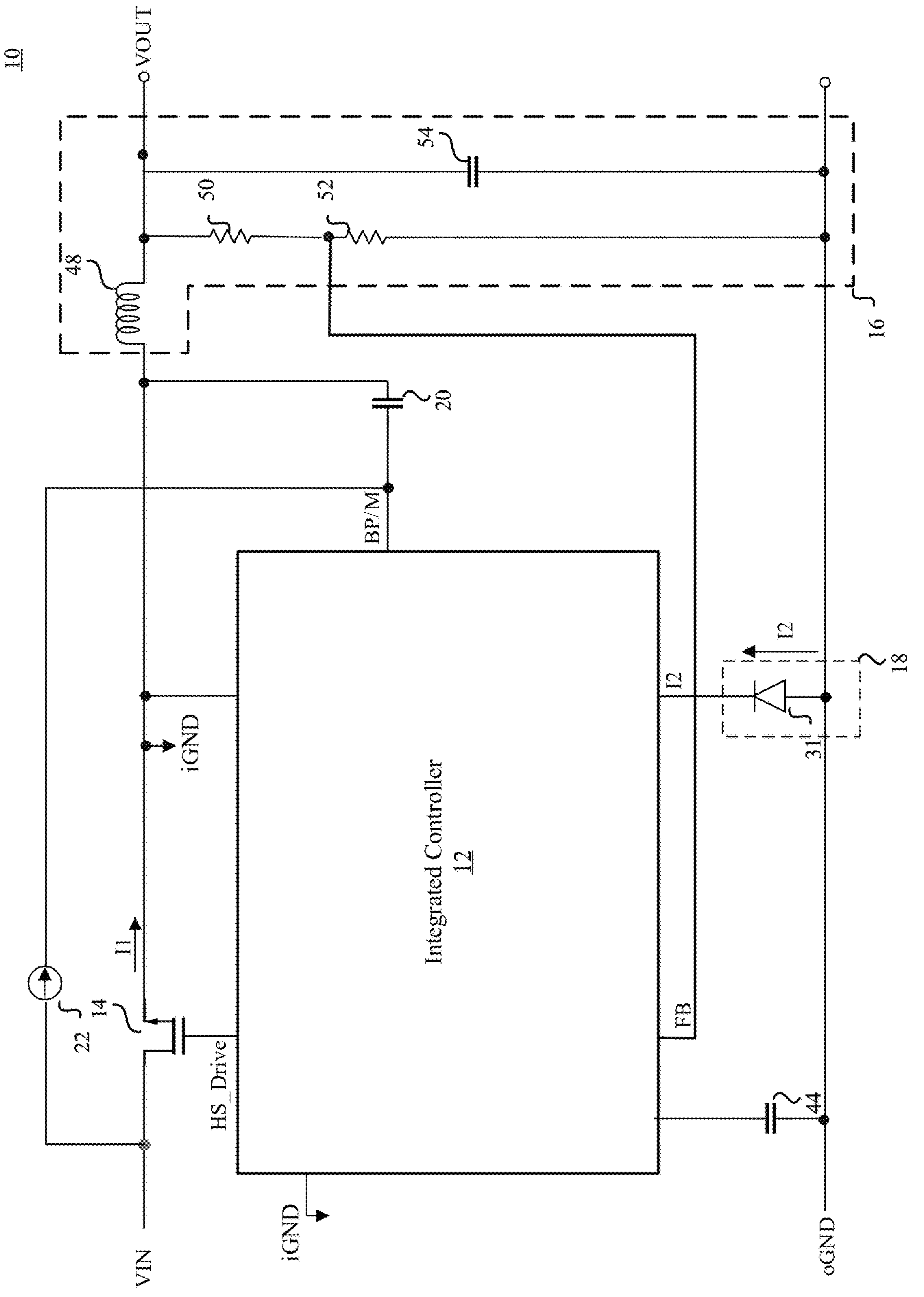
FIG. 1 illustrates an example of a power converter that uses a controller having an integrated input side bias self-supply and an output conduction detector in accordance with teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments of the present invention.

DETAILED DESCRIPTION

In the following description, numerous specific details are set forth to provide a thorough understanding of the present invention. It will be apparent, however, to one having ordinary skill in the art that the specific detail need not be employed to practice the present invention. In other instances, well-known materials or methods have not been described in detail to avoid obscuring the present invention.

Reference throughout this specification to "one embodiment", "an embodiment", "one example" or "an example" means that a particular feature, structure, or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The embodiments disclosed are directed towards output conduction detection for a buck converter having a controller coupled to an input switch, e.g., a high side switch, an output conductor circuit, e.g., a freewheeling diode or synchronous rectifier, an inductive storage element, a feedback circuit, and an output filter circuit. The controller includes a control circuit for the input switch and the output conductor circuit, a bias drive circuit coupled to a bias transistor, a bias diode, and an output conduction detector. The buck converter may be synchronous or non-synchronous. The output conduction detector is configured to detect the voltage across the bias transistor. The bias transistor has an output coupled to the inductive storage element. The bias diode has a first end coupled to an input of the bias transistor and to an output of the output conductor circuit and has a second end coupled to the bias capacitor. The output conductor circuit delivers current to the bias transistor when a bias drive signal is asserted. The output conductor circuit delivers current to the bias capacitor when the bias drive signal is deasserted.

The additional current sense for the bias transistor or drain voltage sense allows visibility of the output conduction period. During the output conduction period, there is a freewheeling current I2 through the output path (either the synchronous rectifier or freewheeling diode) and either the bias transistor or the bias diode of the bias supply circuit. This freewheeling current I2 raises the voltage on the drain of the bias transistor above the source of the input switch and, furthermore, above a voltage of the bias capacitor when the freewheeling current I2 is directed through the bias diode (the bias transistor is non-conducting).

FIG. 1 illustrates an example schematic diagram of a buck converter 10 that uses an integrated controller 12. The integrated controller 12 includes an integrated input side bias self-supply and an output conduction detector in accordance with teachings of the present invention.

The output voltage of the buck converter 10 is sensed directly with feedback resistors 50 and 52 on the output side of the buck converter 10. The integrated controller 12 couples to an input switch 14, an output filter circuit 16, and an output conductor circuit 18. A bias capacitor 20 is coupled from a bias node BP/M of the integrated controller 12 to the output filter circuit 16. The drain of the input switch 14 is coupled to the Vin terminal of the power supply (not shown) and the source of the input switch 14 is coupled to the output filter circuit 16 and to input side ground iGND. A current source 22 is coupled to the drain of the input switch 14 and to the bias node BP/M.

The output filter circuit 16 illustratively includes an inductive storage element 48, feedback resistors 50, 52, and an output capacitor 54. The inductive storage element 48 is coupled between the source of the input switch 14 and the terminal VOUT. Feedback resistors 50, 52 are coupled between the terminal VOUT and output side ground oGND. The node between the feedback resistors 50, 52 may be accessed to provide a feedback signal FB to the integrated controller 12. The feedback signal FB is indicative of the voltage provided at the output of the buck converter. The output capacitor 54 is coupled between the terminal VOUT and output side ground oGND.

An output conductor circuit 18, e.g., at least one diode 31, is coupled between the output side ground oGND and a drain pin of the integrated controller 12.

Figure 2:
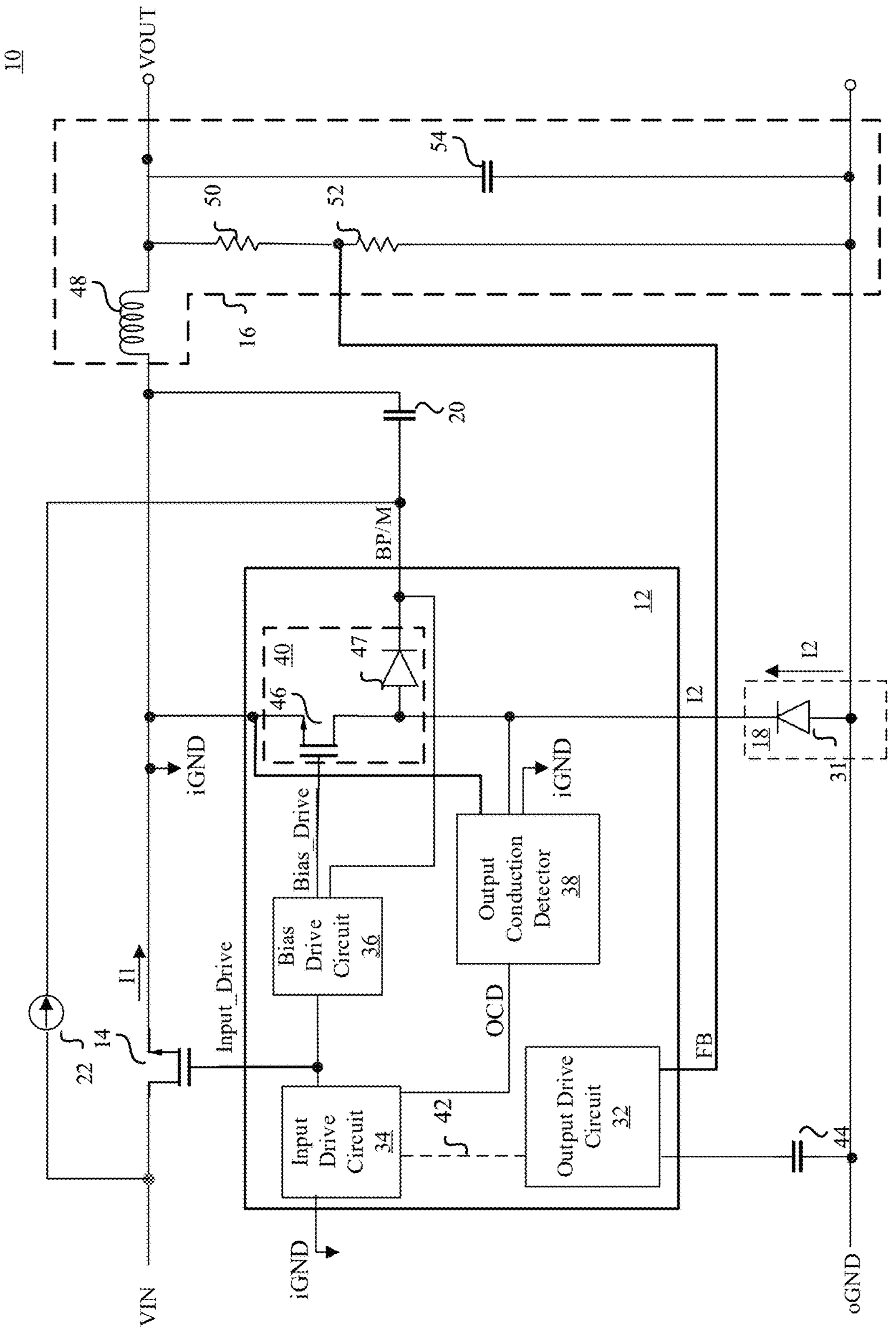
FIG. 2 illustrates an example functional block diagram of a buck converter including output conduction detection.

FIG. 2 illustrates an example functional block diagram of the integrated controller 12 with an integrated input side bias self-supply function connected as a buck converter 10.

The controller 12 includes an output drive circuit 32, an input drive circuit 34, a bias drive circuit 36, an output conduction detector circuit 38, and may further include a bias supply circuit 40. The controller 12 facilitates communication between the input and output sides of the buck converter. The bias drive circuit 36 may be included as part of the input drive circuit 34. The gate of the input switch 14 receives an Input_Drive signal from the input drive circuit 34. An output drive capacitor 44 is coupled between the output drive circuit 32 and the output side ground oGND. The output conduction detector circuit 38 is coupled across the bias supply circuit 40 and sends an output conduction detector (OCD) signal to the input drive circuit 34. The OCD signal indicates the detection of an output conduction event.

The bias supply circuit 40 is coupled to the bias drive circuit 36 and to the source of the input switch 14. The bias supply circuit 40 includes a bias transistor 46 and a bias diode 47. The bias transistor 46 has a gate that receives a bias drive signal Bias Drive from the bias drive circuit 36 and a source coupled to the input side ground iGND. The anode of the bias diode 47 is coupled to the drain of the bias transistor 46. The negative terminal of the bias capacitor 20 is coupled to the input side ground iGND and the cathode of the bias diode 47. The bias node BP/M between the bias diode 47 and the bias capacitor 20 may be accessed to provide voltage data to the bias drive circuit 36.

In operation, the feedback information derived from feedback resistors 50, 52 is communicated to the input drive circuit 34 from the output drive circuit 32. The input drive circuit 34 provides an Input_Drive signal to the bias drive circuit 36 which in turn provides the Bias_Drive signal to the gate of bias transistor 46. Thus, based on the state of the Input_Drive signal, the freewheeling current I2 is available to the output filter circuit 16 when the bias transistor 46 is conducting or the freewheeling current I2 is diverted through bias diode 47 into the bias capacitor 20 when bias transistor 46 is non-conducting. The voltage across the bias supply circuit 40 is received by the output conduction detector circuit 38.

The output conduction detector circuit 38 determines the voltage across bias transistor 46. If the voltage is above a threshold voltage, an OCD signal is sent to the input drive circuit 34. The OCD signal indicates that there is an output conduction event. In response to the assertion of the OCD signal, the input drive circuit 34 may disable the Input_Drive signal.

Figure 3:
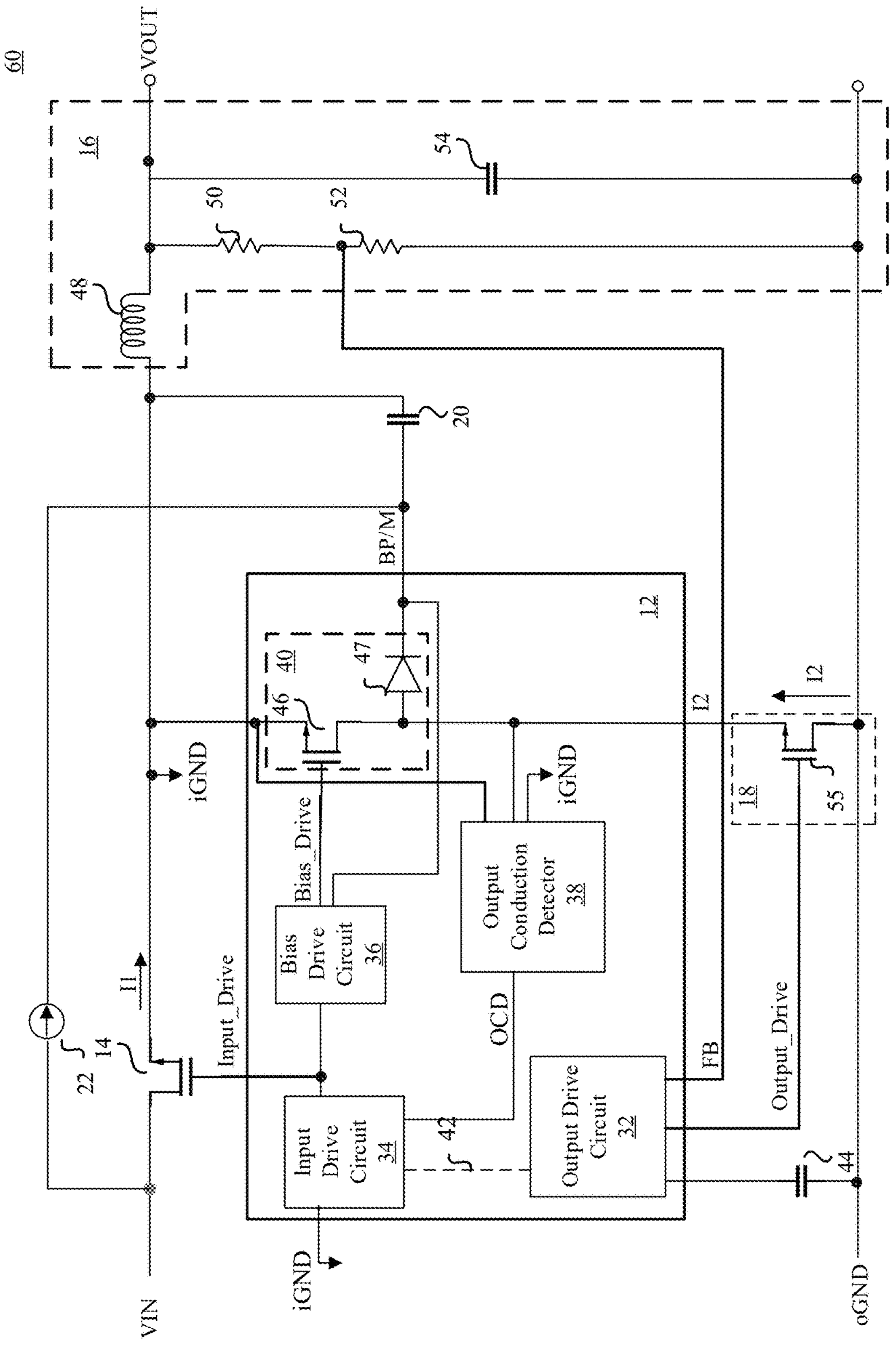
FIG. 3 illustrates another example functional block diagram of a buck converter including output conduction detection.

FIG. 3 illustrates another example functional block diagram of a buck converter 60 including output conduction detection. In this embodiment, the output conductor circuit 18 is a synchronous rectifier 55. The synchronous rectifier 55 has lower losses when used as an output switch, compared to the diode. It also enables zero voltage switching of the buck converter 60.

The output conduction detector circuit 38 is coupled across the bias transistor 46 and detects the drain to source voltage VDS across the bias transistor 46. The voltage VDS is proportional to the current during the output conduction period of the buck converter. The voltage VDS varies between 0 V and the combined voltage of the voltage across the bias capacitor 20 ($V_{CBP}$) and the voltage across the bias diode 47 ($V_{BIAS}$).

Figure 4:
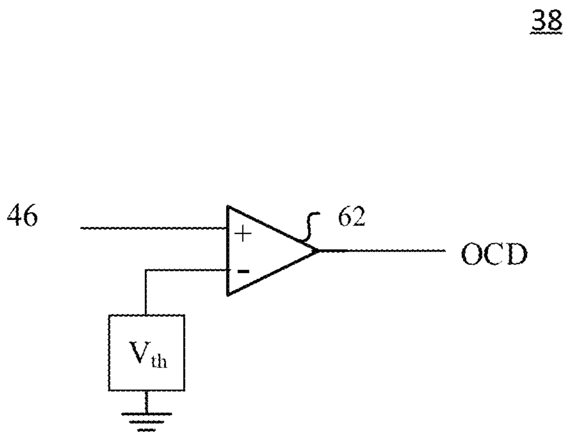
FIG. 4 is an example of a logic diagram corresponding to the output conduction detector circuit 38 shown in FIG. 2 and FIG. 3.

FIG. 4 is an example of a logic diagram corresponding to the output conduction detector circuit 38 shown in FIG. 2 and FIG. 3.

A comparator 62 has a positive input coupled to receive the voltage at the drain of the bias transistor 46 and a negative input coupled to the threshold voltage $V_{th}$. If the output of the second comparator 62 shows that the drain to source voltage (VDS) across the bias transistor 46 is above the threshold voltage $V_{th}$, then output conduction has been detected, e.g. the output conduction detection (OCD) signal is asserted.

Figure 5:
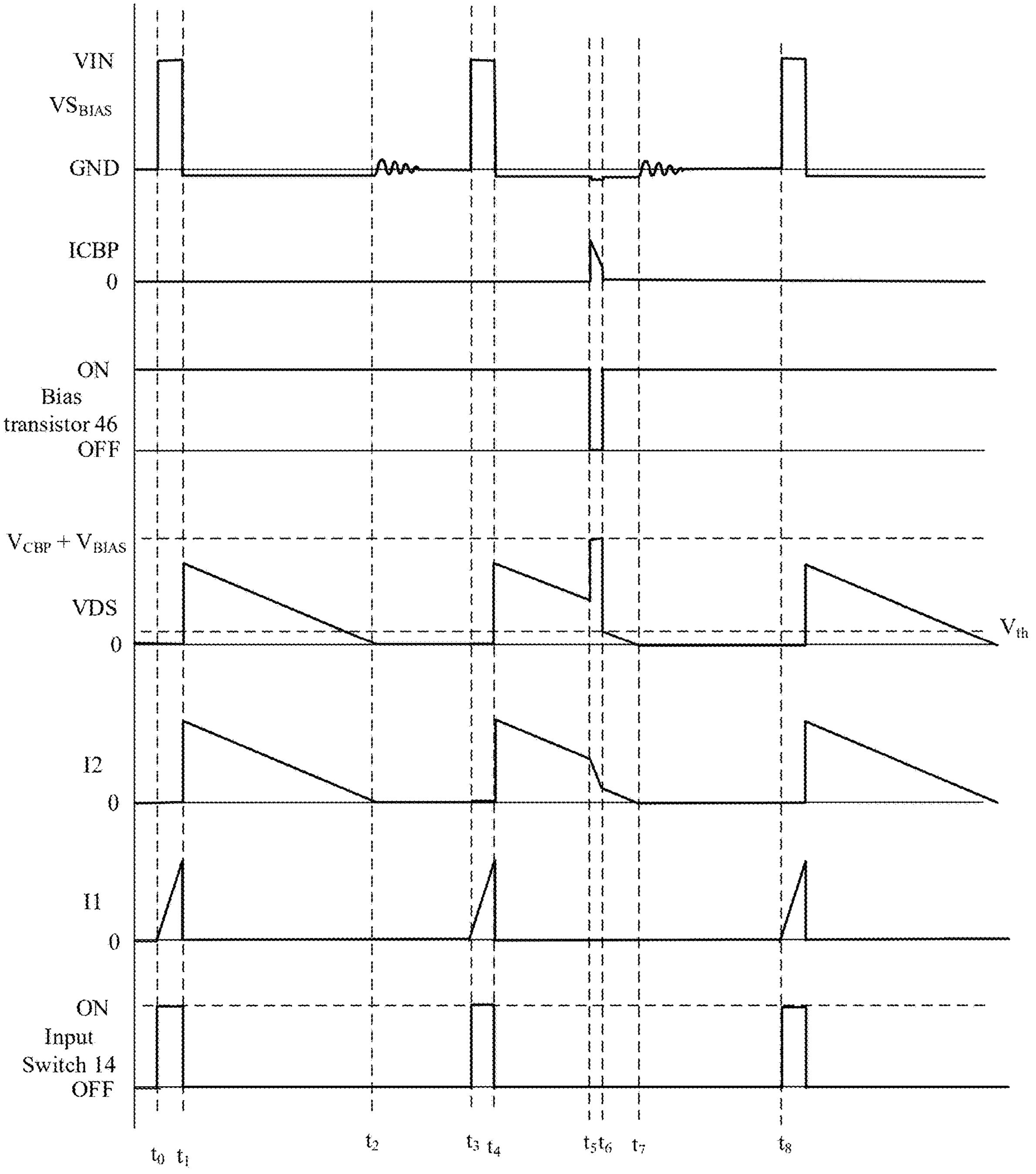
FIG. 5 shows timing diagram waveforms to describe the operation of the converter shown in FIG. 2 or FIG. 3. Duration $t_1$-$t_2$ describes output conduction detection when freewheeling current flows through the bias transistor of a bias supply circuit. Duration $t_4$-$t_4$ describes output conduction detection when a bias capacitor is charged.

FIG. 5 shows timing diagram waveforms to describe the output conduction detection of the converter shown in FIG. 2 or FIG. 3. Duration $t_1$-$t_2$ describes when the output side or freewheeling current I2 flows through the bias transistor 46 of the bias supply circuit 40. Duration $t_5$-$t_6$ describes an output conduction detection event while the bias capacitor 20 is charged. The voltage $VS_{BIAS}$ corresponds to the voltage at the source of the bias transistor 46 and the source of the input switch 14.

At time $t_0$, the input switch 14 is conducting until time $t_1$. During that time, a primary current I1 ramps in the input switch 14 and the inductive storage element 48. The switching cycle shown prior to $t_0$ is one where the bias transistor 46 remains on the whole time such that the bias capacitor 20 is not recharged. ICBP is the current that flows to the bias capacitor 20. When the bias capacitor is not recharged, ICBP is 0. The input drive circuit 34 controls the switching of the bias transistor 46 to perform the regulation of voltage across the bias capacitor 20.

At time $t_1$, the input switch 14 is non-conducting and the freewheeling current I2 is established flowing through the output conductor circuit 18 (e.g., diode 31) and the bias transistor 46. The bias transistor 46 is conducting. The voltage across input switch 14 is approximately the input voltage Vin to the buck converter plus the total forward drop across the output conductor circuit 18 and resistive drop across the bias transistor 46. The resistive drop across the bias transistor 46 is proportional to the freewheeling current I2.

At time $t_2$, the energy stored in the inductive storage element 48 at time $t_1$ has decayed to zero and the freewheeling current I2 is zero. At this time, the voltage across the input switch 14 reduces to an average value of (Vin−Vout) although it rings around this voltage at a frequency determined by the parasitic capacitance and inductance values associated with the inductor 48.

At time $t_3$, the input switch 14 is conducting until time $t_4$. During that time, the primary current I1 ramps in the input switch 14 and the inductive storage element 48. The switching cycle shown prior to $t_3$ is one where the bias transistor 46 remains conducting such that the bias capacitor 20 is not recharged. The input drive circuit 34 controls the switching of the bias transistor 46 to perform the regulation of voltage across the bias capacitor 20.

At time $t_4$, the input switch 14 is non-conducting and the freewheeling current I2 is established flowing through the output conductor circuit 18 and the bias transistor 46. The bias transistor 46 is conducting. The voltage across the input switch 14 is approximately the input voltage Vin plus the total forward drop across the output conductor circuit 18 and the resistive drop across bias transistor 46. During the output conduction period, the resistive drop across the bias transistor 46 is proportional to the freewheeling current I2.

At time $t_5$, the input drive circuit 34 detects the need to replenish the charged stored in the bias capacitor 20 and places the bias transistor 46 into a non-conducting state. ICBP is the current flowing into the bias capacitor during replenishment. At this time, the voltage across the input switch 14 increases to Vin plus the total forward drops across the output conductor circuit 18 and the bias diode 47 plus the voltage on the bias capacitor 20 to maintain the flow of the freewheeling current I2. ICBP is now equal to the freewheeling current I2. The freewheeling current I2 flows into the bias capacitor 20.

The di/dt slope in the freewheeling current I2 increases from period $t_5$ to $t_6$ due to the higher voltage in the freewheeling current path, e.g., the voltage on the bias capacitor 20 is added to the freewheeling path.

At time $t_6$, the input drive circuit 34 detects that no further charge is required to be stored in the bias capacitor 20 and places the bias transistor 46 back into a conducting state.

At time $t_7$, the energy stored in the inductive storage element 48 at time $t_4$ has decayed to zero and the freewheeling current I2 is zero. At this time, the voltage across the input switch 14 reduces to an average value of (Vin−Vout) although it rings around this voltage at a frequency determined by the parasitic capacitance and inductance values associated with the inductive storage element 48.

From $t_6$ to $t_7$, the di/dt of the freewheeling current I2 is substantially the same as the di/dt of freewheeling current I2 between times $t_4$ and $t_5$.

At time $t_8$, another converter switching cycle is initiated when the input switch 14 begins to conduct.

Figure 6:
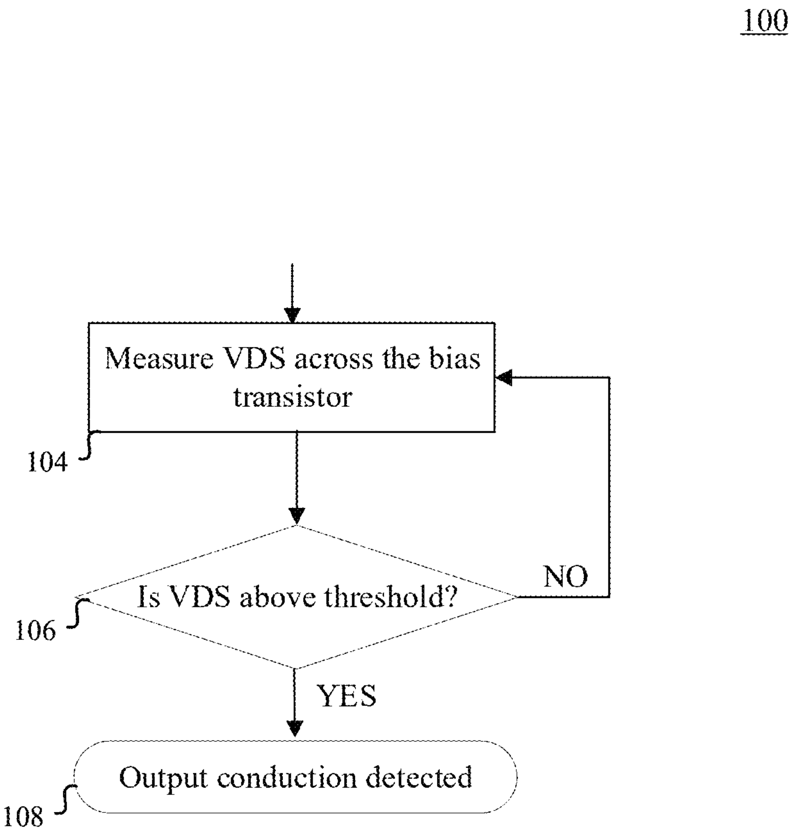
FIG. 6 is a process flowchart 100 for output conduction detection as shown in the waveforms of FIG. 5.

FIG. 6 is a process flowchart 100 for output conduction detection as shown in the timing diagram waveforms of FIG. 5.

In step 104, the output conduction detector circuit 38 measures the voltage VDS across the bias transistor 46.

In step 106, it is determined if the voltage VDS across the bias transistor 46 is above a threshold voltage $V_{th}$. If no, output conduction is not detected, repeat from step 104. If yes, in step 108, output conduction is detected.

Figure 7:
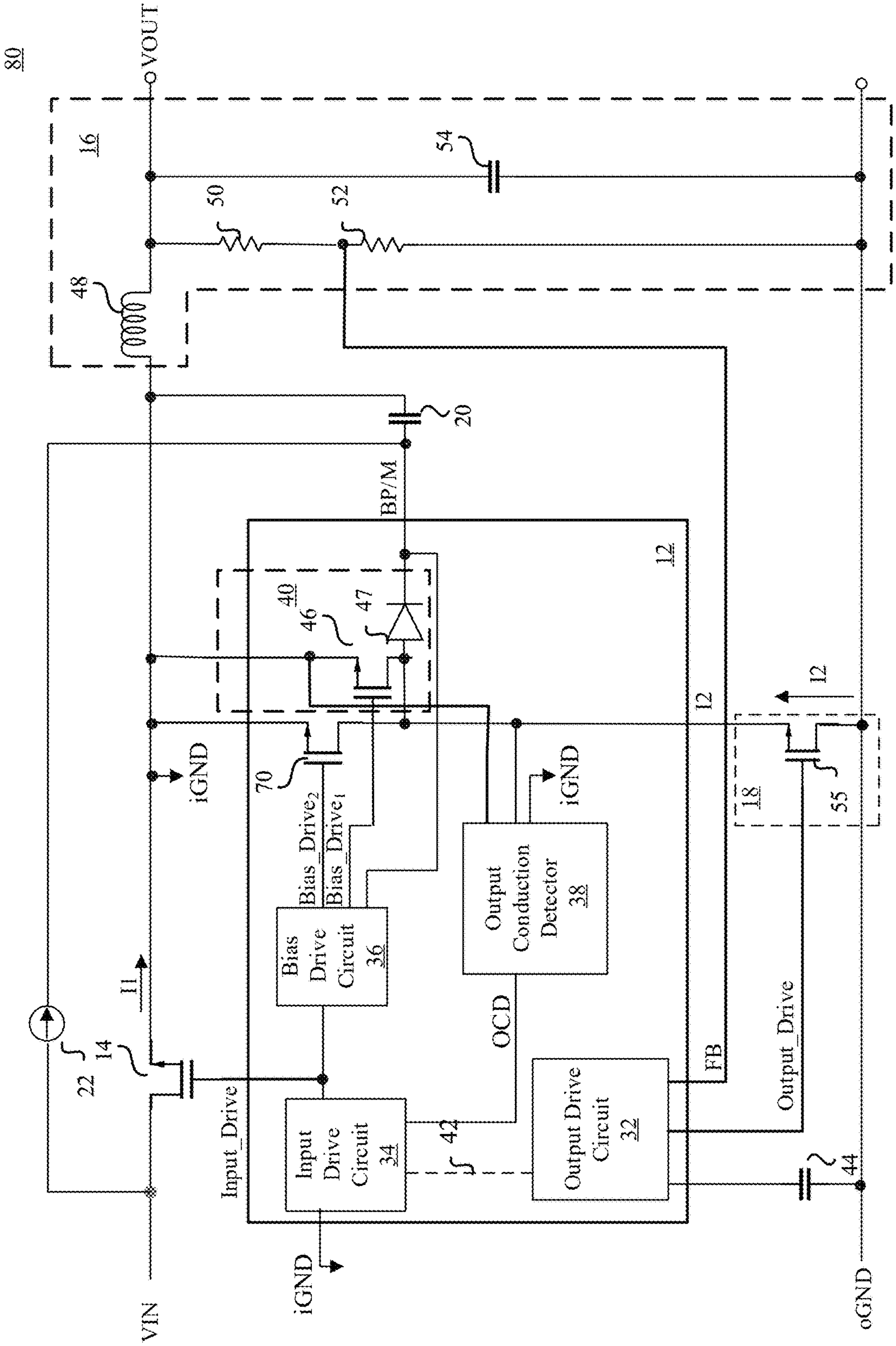
FIG. 7 illustrates an example functional block diagram of an integrated controller with an integrated input side bias self-supply function connected as a buck converter.

FIG. 7 illustrates an example functional block diagram of the integrated controller 12 with an integrated input side bias self-supply function connected as a buck converter 80.

Like the examples in FIG. 2 and FIG. 3, the controller 12 of FIG. 7 includes an output drive circuit 32, an input drive circuit 34, a bias drive circuit 36, an output conduction detector circuit 38, and may further include a bias supply circuit 40. The controller 12 facilitates communication between the input and output sides of the power converter. The bias drive circuit 36 may be included as part of the input drive circuit 34. The gate of the input switch 14 receives an Input_Drive signal from the input drive circuit 34. An output drive capacitor 44 is coupled between the output drive circuit 32 and the output side ground oGND. The output conduction detector circuit 38 is coupled across the bias supply circuit 40 and sends an output conduction detector (OCD) signal to the input drive circuit 34. The OCD signal indicates the detection of an output conduction event.

The bias supply circuit 40 is coupled to the bias drive circuit 36 and to the source of the input switch 14. Unlike in FIG. 2 and FIG. 3, the bias supply circuit 40 of FIG. 7 includes a first bias transistor 46, a second bias transistor 70, and a bias diode 47. The first bias transistor 46 has a gate that receives a $Bias\_Driver_1$ signal from the bias drive circuit 36 and a source coupled to the input side ground iGND. The second bias transistor 46 has a gate that receives a $Bias\_Drive_2$ signal from the bias drive circuit 36 and a source coupled to the input side ground iGND. The anode of the bias diode 47 is coupled to the drains of the first and second bias transistors 46, 70. The negative terminal of a bias capacitor 20 is coupled to the input side ground iGND and the cathode of the bias diode 47. The bias node BP/M between the bias diode 47 and the bias capacitor 20 may be accessed to provide voltage data to the bias drive circuit 36.

The second bias transistor 70 has a higher RdsON value than the first bias transistor 46.

In operation, the first and second bias transistors 46, 70 are driven at the same time by the bias drive circuit 36. When the secondary discharge time is over, e.g., the $Bias\_Drive_1$ signal is deasserted, the $Bias\_Drive_2$ signal remains asserted in case there is residual freewheeling current I2 that would increase the voltage on the drain of the second bias transistor 70. This may allow the detection of lower freewheeling current discharge.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

The invention claimed is:

1. An integrated controller for a buck converter comprising:

a controller coupled to receive a feedback signal indicative of an output voltage of the buck converter and responsive to the feedback signal to produce an input drive signal;

a bias drive circuit coupled to the controller and responsive to the input drive signal to produce a bias drive signal;

a bias supply circuit comprising, a bias transistor having a gate coupled to receive the bias drive signal, and a bias diode, an anode of the bias diode coupled to a drain of the bias transistor and a cathode of the bias diode coupled to the bias drive circuit, wherein the bias transistor enters a conducting state responsive to the bias drive signal being asserted; and an output conduction detector circuit coupled to the bias transistor, the output conduction detector circuit being configured to:

determine whether a voltage at the bias transistor is above a threshold voltage, detect an output conduction event based on a determination that the voltage at the bias transistor is above the threshold voltage, wherein the output conduction event corresponds to conduction of freewheeling current through either the bias transistor or the bias diode, and produce an output conduction signal responsive to detection of the output conduction event.

2. The integrated controller as in claim 1, the output conduction detector circuit comprising a comparator configured to compare a voltage at the drain of the bias transistor to the threshold voltage to detect the output conduction event.

3. The integrated controller as in claim 1, wherein:

the voltage at the bias transistor is a drain to source voltage; and during the output conduction event, a voltage at the drain of the bias transistor rises above a voltage at a source of the bias transistor due to conduction of freewheeling current.

4. The integrated controller as in claim 1, wherein:

the controller comprises an input drive circuit configured to provide the input drive signal to an input switch of the buck converter; and the input drive circuit is further configured to disable the input drive signal in response to the output conduction signal.

5. The integrated controller as in claim 1, wherein freewheeling current is conducted through:

the bias transistor when the bias drive signal is asserted; and the bias diode when the bias drive signal is deasserted.

6. The integrated controller as in claim 5, wherein:

conduction through the bias transistor makes the freewheeling current available to an output filter circuit of the buck converter; and conduction through the bias diode diverts the freewheeling current into a bias capacitor of the buck converter.

7. A buck converter comprising:

an input switch;

an output filter circuit coupled to the input switch, the output filter circuit configured to produce a feedback signal indicative of an output voltage of the buck converter;

a bias capacitor coupled to the output filter circuit;

an output conductor circuit coupled to the output filter circuit; and a controller coupled to the output filter circuit, the controller comprising, an output drive circuit coupled to the output filter circuit, the output drive circuit configured to receive the feedback signal;

an input drive circuit coupled to the output drive circuit, the input drive circuit responsive to the feedback signal to produce an input drive signal;

a bias drive circuit coupled to the bias capacitor and to the input drive circuit, the bias drive circuit responsive to the input drive signal to produce a bias drive signal;

a bias supply circuit comprising, a bias transistor having a gate coupled to receive the bias drive signal, and a bias diode, an anode of the bias diode coupled to a drain of the bias transistor and a cathode of the bias diode coupled to the bias drive circuit, wherein the bias transistor enters a conducting state responsive to the bias drive signal being asserted; and an output conduction detector circuit coupled to the source and to a drain of the bias transistor, and responsive to detection of a voltage drop across the bias transistor to produce an output conduction signal.

8. The buck converter as in claim 7, wherein the input drive circuit and the output drive circuit are included in a single integrated circuit package.

9. The buck converter as in claim 8, wherein the input drive circuit and the output drive circuit are included in a monolithic integrated circuit.

10. The buck converter as in claim 7, the output conduction detector circuit comprising a comparator configured to compare a voltage at the drain of the bias transistor to a threshold voltage.

11. The buck converter as in claim 10, the output conductor circuit comprising at least one diode.

12. The buck converter as in claim 10, wherein:

the output drive circuit is configured to produce an output drive signal in response to the feedback signal; and the output conductor circuit comprises a switch coupled to the output drive circuit, the switch coupled to receive the output drive signal and in response deliver current to one of the bias diode and the bias transistor.

13. The buck converter as in claim 10, wherein the voltage drop across the bias transistor involves the voltage at the drain of the bias transistor rising above a voltage at a source of the bias transistor due to conduction of freewheeling current.

14. The buck converter as in claim 13, wherein:

the output conductor circuit comprises a synchronous rectifier coupled to the drain of the bias transistor and the anode of the bias diode;

the synchronous rectifier is controlled using an output drive signal produced by the output drive circuit; and the freewheeling current is conducted through the synchronous rectifier and, depending on whether the bias drive signal is asserted, through either the bias transistor or the bias diode.

15. The buck converter as in claim 7, wherein the voltage drop across the bias transistor indicates that freewheeling current is conducting through either the bias transistor or the bias diode.

16. The buck converter as in claim 7, wherein:

the input drive signal controls the input switch; and the input drive circuit is configured to disable the input drive signal in response to the output conduction signal.

* * * * *